3,449,327
2-CYANO-3-AMINO-ESTRATRIENES AND A METHOD OF THEIR PREPARATION
Pietro de Ruggieri, Carmelo Gondolfi, and Umberto Guzzi, Milan, Italy, assignors to Ormonoterapia Richter, S.p.A., Milan, Italy, a corporation of Italy
No Drawing. Filed Aug. 22, 1966, Ser. No. 573,812
Claims priority, application Italy, Aug. 23, 1965, 18,857/65
Int. Cl. C07c 173/10, 173/00, 169/08
U.S. Cl. 260—239.5     4 Claims

ABSTRACT OF THE DISCLOSURE

There are provided 2-cyano-3-amino and substituted amino steroids which are aromatic in ring A. The compounds of the invention are useful as therapeutic agents, having estrogenic, hypocholesterolemic, hypotensive and anti-hormonal activity, and act as fertility-controlling substances.

This invention relates to compounds having the following formula:

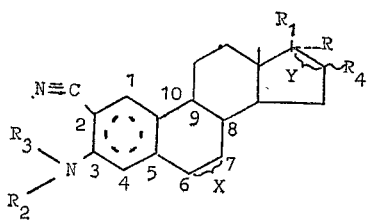

wherein the steroidal ring A is an aromatic ring, which can be either the 1,3,5(10) or the 2,4,10(1)-triene mesomer. The substituents, indicated by R, $R_1$, $R_2$, $R_3$, $R_4$, X, and Y are specified as follows:

R=hydrogen, lower alkyl, alkenyl, such as —CH=CH—b (b being hydrogen or a lower alkyl), alkynyl, such as —C≡C—b (b being hydrogen or lower alkyl) hydroxy, 2'-tetrahydropyranyloxy,

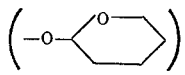

or acyloxy with the acyl radical being the same as that of a saturated or unsaturated carboxylic acid having 2 to 10 C atoms;
$R_1$=hydrogen, hydroxy, 2'-tetrahydropyranyloxy

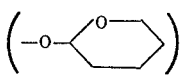

lower alkoxy, $C_8H_{17}$, or acyloxy with the acyl radical being the same as that of a saturated or unsaturated aliphatic carboxylic acid having 2 to 10 C atoms, aralkanoyl of the type derived from acids, such as phenylacetic, phenylpropionic, phenylpropiolic and cinnamic (cis and trans) or aroyl of the type derived from acids, such as benzoic, salicylic and p-amino-benzoic; or
R and $R_1$ together may be 17-keto or 17,17-ethylendioxy;
$R_2$=hydrogen, 2'-tetrahydropyranyl

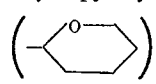

lower alkyl, phenyl, benzyl, methoxycarbonyl ($CH_3OCO$)

ethoxycarbonyl ($C_2H_5OCO$—) or acyl derived from a saturated or unsaturated carboxylic acid having 2 to 10 C atoms;

$R_3$=hydrogen, alkyl, acyl with the acyl radical being the same as that of a saturated or unsaturated aliphatic carboxylic acid having 2 to 10 C atoms, aralkanoyl of the type derived from acids, such as phenylacetic, phenylpropionic, phenylpropiolic and cinnamic (cis and trans) or araoyl of the type derived from acids, such as benzoic, salicylic and p-aminobenzoic; or
$R_2$ and $R_3$ together may be $C_6H_5$—CH=, p—$NO_2C_6H_4$—CH= p—$NH_2$— or p-dimethylamino—$C_6H_4$—CH=.

$C_2H_5OCH=$

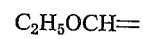

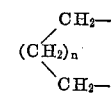

wherein n=1, 2, or 3

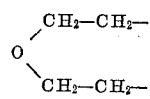

or

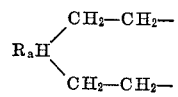

wherein $R_a$ is hydrogen or lower alkyl;
$R_4$=H, Cl, Br, I, OH, or $CH_3$, all of which substituents may take the α or β configuration; and
X and Y indicate that the bond between the 6,7 and 16,17 C atoms may be single or double.

These compounds which show therapeutic properties, having estrogenic, hypocholesterolemic, hypotensive, and anti-hormonal activity, and act as fertility-controlling substances, are synthesized from compounds of formula

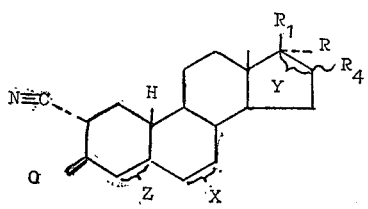

wherein R, $R_1$, $R_4$ X and Y have the meanings given above and Z indicates that the bond between the 4, 5 C atoms may be single or double.

By reacting these compounds, in solvents, such as toluene, benzene, and iso-octane with primary and secondary aliphatic and aromatic amines and heterocyclic amides, such as n-propyl and n-butyl, sec-butyl, n-pentyl, n-hexylamine, diethylamine, butylethylamine, aniline, benzylamine and amines of the formulae

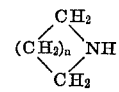

wherein n=1, 2, 3, and

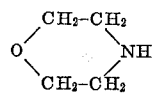

and

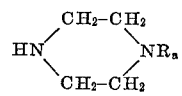

$R_a$ being H or lower alkyl or by reacting these same compounds with ammonium formate or with the formates of the above described amines in ethanol, there are obtained compounds of the following general formula:

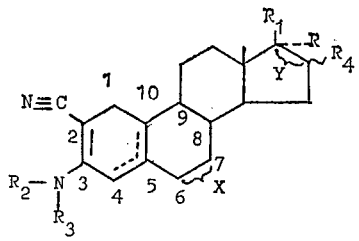

R, $R_1$, $R_2$, $R_3$, $R_4$, X and Y have the meanings given above and the dotted lines, linking the 4,5 and 5,10 C atoms in the ring A indicate that the obtained products are a mixture of the 4,5- and 5,10-ene isomers which can be separated by fractional crystallization and by chromatography to give the two pure isomers.

The mixture of the two isomers, and the individual isomers are successively dehydrogenated and aromatized in the presence of hydrogen, such as unsaturated esters of the type of ethyl and methyl maleate, fumarate, and cinnamate, other ethylene compounds of the type of stilbene and styrene and quinones type of dichloro-dicyano - benzoquinone (DDQ) and tetrachlorobenzoquinone (chloranyl), with or without the help of hydrogen transfer agents as Pd/C or Pt/C, in solvents of the type of benzene, dioxane, iso-octane, ethyleneglycol and oil, at temperatures of from 10 to 280° C.

The following examples are intended to illustrate and not to limit the invention.

EXAMPLE 1

2-cyano-3-amino-estra-1,3,5(10)-triene-17β-ol-17-acetate 20.50 parts of 2α-cyano-estra-4-ene-17β-ol-3-one-17-acetate in 900 parts absolute ethanol are refluxed under a nitrogen stream for 24 hours with 13.90 parts of ammonium formate. The reaction mixture is concentrated under vacuum to dryness, the solid are suspended in water, extracted with methylene chloride and washed with water to neutrality. The product is recrystallized from sulfuric ether to obtain 18.2 parts of a mixture of 2-cyano-3-amino-estra-2,4-diene-17β-ol-17-acetate and of 2-cyano-3-amino-estra-2,5(10)-diene-17β - ol - 17-acetate (3:1), M.P. 192–194 C.; $\lambda_{max}$ 248, 261, 332 mμ (ε 5000, 4200, 2000).

10.5 parts of this mixture are dissolved in 250 parts of anhydrous dioxane, 12 parts of diethyl maleate are added, and refluxed under stirring for 20 hours with 8–10 parts 10% Pd/C. The catalyst is filtered off, the filtrate evaporated to dryness and washed with boiling hexane. The residue crystallized from methanol gives 9.2 parts of 2 - cyano - 3 - amino - estra - 1,3,5(10) - triene - 17β - ol-17-acetate, M.P. 244–246° C.; $\lambda_{max}$ 220, 246, 331, 5 mμ (ε=46,000, 9,400, 4,000).

EXAMPLE 2

2-cyano-3-amino-estra-1,3,5(10)-triene-17β-ol-17-acetate 22.5 parts of the mixture of 2-cyano-3-amino-estra-2,4(5)-diene-17β-ol-17-acetate and of 2-cyano-3-amino-estra-2,5(10)-diene-17β-ol-17-acetate, as prepared in the preceding example, are dissolved in 150 parts of dioxane and 2 parts of 2,3-dicyano-5,6-dichlorobenzoquinone dissolved in 70 parts dioxane are added.

After 5 minutes of rest at room temperature, the mixture is diluted with 1000 parts of $CH_2Cl_2$, filtered and percolated through a column of silica gel (400 g.).

3000 more parts of methylene chloride-dioxane (95:5) is allowed to percolate and the eluates are evaporated to dryness to obtain 16.2 parts of 2-cyano-3-amino-estra-1,3,5(10)-triene-17β-ol-17-acetate, M.P. 240–243° C.

EXAMPLE 3

2-cyano-3-acetylamino-estra-1,3,5(10)-triene-17β-ol-17-acetate 10 parts of the mixture of 2-cyano-3-amino-estra-2,4- and 2,5(10)-diene-17β-ol-17-acetate of Example 1 are dissolved in 60 parts of pyridine and 2.4 parts acetyl chloride are added at 0° C. The mixture is kept two hours at 0° C. and overnight at room temperature. After dilution with water, extraction with methylene chloride, and washing with water to neutrality, there are obtained 10 parts of 2-cyano-3-acetylamino-estra-2,4- and 2,5(10)-diene-17β-ol - 17 - acetates, [α]_D=+60° (chloroform), M.P. 211–214° C.; $\lambda_{max}$ 243, 306 mμ (ε 7000, 2000).

The mixture is adsorbed on an alumina column, and by eluting with a mixture of methylene chloride-hexane (80:20), there are obtained 5.2 parts of pure 2-cyano-3-acetylamino-estra-2,5(10)-diene-17β-ol-17 - acetate M.P. 224–226° C.; [α]_D=+105° (CHCl_3); $\lambda_{max}$ 248 mμ (ε 6500). From the successive methylene chloride 9:1 and methylene chloride fractions, there were obtained 2.8 parts of pure 2-cyano-3-amino-estra-2,4(5)-diene-17β-ol-17-acetate M.P. 215–216° C.; [α]_D=−54°; $\lambda_{max}$ 231, 308 mμ (ε 11000, 7200). 3.8 parts of 2-cyano-3-acetylamino-estra-2,5(10)-diene-17β-ol-17-acetate are dissolved in 80 parts of anhydrous dioxane and 2.5 parts of 2,3- dicyano-5,6-dichloro-benzoquinone in 40 parts dioxane are added. After 10 minutes, the mixture is diluted with 750 parts of methylene chloride, the 2,3-dicyano-5,6-dichloro-1,4-hydroquinone is filtered out and the filtrate percolated through a column of 250 parts alumina. 1000 parts more of methylene chloride are passed through, and the eluates are evaporated to dryness to give 3.4 parts of 2-cyano-3-acetylamino-estra-1,3,5(10)-triene-17β-ol-17-acetate, M.P. 196–198° C. An analytical sample shows M.P. 201–202° C.; [α]_D=+46° (CHCl_3); $\lambda_{max}$ 224, 243, 294 mμ (ε 30,000, 13,000, 2,400).

EXAMPLE 4

2-cyano-3-acetylamino-estra-1,3,5(10)-triene-17β-ol-17-acetate

A solution of 1 part of 2-cyano-3-acetylamino-estra-2,4-diene-17β-ol-17-acetate in 25 ml. dioxane is heated under stirring and under reflux for 48 hours with 1 part of 10% Pd/C and 1.1 parts of ethyl maleate. The catalyst is filtered off, the filtrate is evaporated to dryness and chromatographed on 100 parts alumina with cyclohexane-ethyl acetate 80:20 as eluant. By evaporating the solvent and recrystallizing from methanol, there are obtained 0.61 part of 2-cyano-3-acetylamino-estra-1,3,5(10)-triene-17β-ol-17-acetate, M.P. 201–202° C.; [α]_D=+46° (chloroform). The same product can also be prepared by acetylation at a low temperature with pyridine acetic anhydride of 2-cyano-3-amino-estra-1,3,5(10)-triene-17β-ol.

Example 5

2-cyano-3-diacetylamino-estra-1,3,5(10)-triene-17β-ol-17-acetate 2.5 parts of 2 - cyano-2-amino-estra-1,3,5(10)-triene-17β-ol-17-acetate are dissolved in 10 parts of pyridine and 5 parts of acetic anhydride are added. The solution is refluxed for 2 hours and after cooling is diluted with water and filtered. The solid residue is recrystallized from methanol to give 2.52 parts of 2-cyano-3-diacetylamino-estra-1,3,5(10)-triene-17β-ol - 17 - acetate, M.P. 187–189° C.; [α]_D=+60° (chloroform); $\lambda_{max}$ 234, 270 mμ (ε 14,000 4,000).

EXAMPLE 6

2-cyano-3-(N-benzylidenamino)-estra-1,3,5(10)-triene-17β-ol-17-acetate 0.56 part of benzaldehyde are added to a solution of 1.7 parts of 2-cyano-3-amino-estra-1,3,5(10)-triene-17β-ol-17-acetate in methanol. The mixture is kept overnight at room temperature, is concentrated and the crystalline product which separates is filtered out. After recrystallization from ethyl acetate there are obtained 1.72 parts of 2-cyano-3-(N-benzylidenamino)-estra-1,3,5(10)-triene-17β-ol-17-acetate, M.P. 262–264° C.; $[\alpha]_D = +44°$ (CHCl$_3$); $\lambda_{max}$. 249, 256, 309 m$\mu$ ($\epsilon$ 22,000, 22,000, 10,600).

EXAMPLE 7

2-cyano-3-N-(ethoxy-methylidenamino)-estra-1,3,5(10)-triene-17β-ol-17-acetate

A suspension of 2.5 parts of 2-cyano-3-amino-estra-1,3,5(10)-triene-17β-ol-17-acetate in 50 ml. of ethyl orthoformate is refluxed for 24 hours and successively evaporated to dryness. By recrystallizing from methanol there are obtained 2.41 parts 2-cyano-3-N-(ethoxy-methylidenamino)-estra-1,3,5(10)-triene-17β-ol-17-acetate, M.P. 193–195° C.; $[\alpha]_D = +60°$ (CHCl$_3$); $\lambda_{max}$. 217, 261 m$\mu$ ($\epsilon$ 32,500 and 6,900).

EXAMPLE 8

2-cyano-3-(N-ethoxycarbonylamino)-estra-1,3,5(10)-triene-17β-ol-17-acetate 28 parts of 2-cyano-3-amino-estra-diene-17β-ol-17-acetate (the mixture of the two 2,4-and 2,5(10)-diene isomers as obtained in Example 1) are subjected to fractional crystallization from 500 parts of methanol. The first two fractions (14.5 g.) are recrystallized from ethyl acetate and give 11.8 parts of 2-cyano-3-amino-estra-2,5(10)-diene-17β-ol-17-acetate M.P. 215–216° C.; $[\alpha]_D = +105°$; $\lambda_{max}$. 263 m$\mu$ ($\epsilon$ 9000).

The successive fractions from methanol give a product very rich in the 2,4-diene isomer; by successive crystallizations from methanol and ethyl acetate there are obtained 4 parts of 2-cyano-3-amino-estra-2,4-diene-17β-ol-17-acetate M.P. 219–221° C.; $[\alpha]_D = -57°$; $\lambda_{max}$. 222, 233 m$\mu$ ($\epsilon$ 14,500, 5,600).

10.5 parts of 2-cyano-3-amino-estra-2,5(10)-diene-17β-ol-17-acetate are dissolved in 700 parts of toluene. To the solution there are added 13.2 parts of anhydrous finely divided potassium carbonate, and under stirring, 100 parts of toluene are distilled off. Then, 18 parts of ethyl chlorocarbonate diluted in 20 parts of anhydrous toluene are added dropwise. The mixture is refluxed for 24 hours, the inorganic residue is filtered out, the filtrate is cooled, is washed with water to neutrality and is evaporated to dryness to give 9.5 parts of 2-cyano-3-(N-ethoxycarbonylamino)-estra-2,5(10)-diene-17β-ol; $\lambda_{max}$. 248 m$\mu$.

To a solution of 8.25 parts of 2-cyano-3-(N-ethoxycarbonylamino)-estra-2,5(10)-diene-17β-ol in 60 parts of dioxane there are added 5.05 parts 2,3-dicyano-5,6-dichloro-benzoquinone dissolved in 60 parts of dioxane. After 5 minutes the mixture is diluted with 1000 parts of methylene chloride and the precipitated hydroquinone is filtered out. The solution is percolated through alumina and the column is further eluted with 2000 parts of methylene chloride. The united eluates are evaporated to dryness to give 9.5 parts of 2-cyano-3-(N-ethoxycarbonyl-2-cyano-3-(N-ethoxycarbonylamino-estra-1,3,5(10)-triene-17β-ol-17-acetate.

EXAMPLE 9

2-cyano-3-amino-19-nor-cholesta-1,3,5(10)-triene

A suspension of 9.3 parts of 2α-cyano-19-nor-cholesta-4-en-3-one in 50 parts of anhydrous ethanol is refluxed for 48 hours under a stream of nitrogen gas with 2.5 parts of ammonium formate to the total dissolution of the reagents. The mixture is concentrated under vacuum to ⅓ of its volume, the crystallized product is filtered out, suspended in water and again filtered out to give 7.65 g. of crude 2-cyano-3-amino-derivative. By fractional crystallization of 5.1 parts of the crude product from methanol there are obtained 2.45 parts of pure 2-cyano-3-amino-19-nor-cholesta-2,5(10)-diene; $\lambda_{max}$. 263 m$\mu$ ($\epsilon$ 9000) —C≡N 2186 cm.$^{-1}$. From the mother liquors, by chromatography on alumina, there are obtained a further 1.35 parts of 2-cyano-3-amino-19-nor-cholesta-2,4-diene; $\lambda_{max}$. 222, 333 m$\mu$ (13,000, 4,500) —C≡N 2165 cm.$^{-1}$.

1.97 parts of crude 2-cyano-3-amino-19-nor-cholestadiene (mixture of 2,4(5)-diene and 2,5(10)-diene isomers) are dissolved in 40 parts of anhydrous dioxane and there is added a solution of 1.25 parts of 2,3-dichloro-5,6-dicyano-benzoquinone in 20 parts dioxane. The mixture is left at room temperature for 10 minutes, is diluted with methylene chloride and the precipitated hydroquinone filtered out. The filtrate is percolated through an alumina column, and then this is eluted with 1500 parts of methylene chloride. The eluates are evaporated to dryness, and by crystallization from methanol, there are obtained 1.12 parts of 2-cyano-3-amino-19-nor-cholesta-1,3,5(10)-triene; $\lambda_{max}$. 221, 246, 331.5 m$\mu$ ($\epsilon$ 45,000, 9,400, 4,000).

EXAMPLE 10

2-cyano-3-phenylamino-19-nor-cholesta-1,3,5(10)-triene

A solution of 2 parts of 2α-cyano-19-nor-cholesta-4-en-3-one in 25 parts of benzene are refluxed for 8 hours with 0.05 part of p-toluenesulfonic acid and 1.5 parts of aniline while collecting by a Marcusson device the water formed during the reaction.

After cooling, neutralization, and successive washing of the benzene solution with water, alkali and water, the solution was evaporated to dryness. The residue was chromatographed on alumina and from the petroleum ether-ethyl ether 80:20 fraction, are obtained 1.15 parts of 2-cyano-3-phenylamino-19-nor-cholesta-2,4-diene; $\lambda_{max}$. 260, 352 m$\mu$ ($\epsilon$ 14,800, 6,250).

1.1 parts of the above obtained product are dissolved in 25 parts of dioxane to which is added 1.2 parts of ethyl maleate and 0.85 part 10% Pd/C. The mixture is refluxed for 46 hours, the catalyst is filtered off, the filtrate evaporated to dryness and chromatographed on alumina. From the hexane-ethyl ether 85:15 fraction there are obtained 0.45 part of 2-cyano-3-N-phenylamino-19-nor-cholesta-1,3,5(10)-triene.

EXAMPLE 11

2-cyano-3-n-pentylamino-estra-1,3,5(10)-triene-17β-ol-17-acetate

To a solution of 0.9 part of 2α-cyano-19-nor-testosterone-17-acetate in 40 parts benzene there is added 2.5 parts of n-pentylamine and the whole is refluxed for 24 hours, while the water is collected by a Marcusson device. The reaction mixture is evaporated to dryness and by crystallization from methanol, there are obtained 0.685 part 2-cyano-3-n-pentylamino-estra-2,4-diene-17β-ol-17-acetate; M.P. 179–181° C. ($\lambda_{max}$ 233, 338.5 m$\mu$; $\epsilon$ 15,000, 4,700).

To a solution of 0.5 part of this compound in 7 parts dioxane there is added 0.3 part DDQ at room temperature. The separated hydroquinone is filtered out, the filtrate is evaporated to dryness, and the residue is dissolved in ethyl ether. The ethereal solution is washed with alkali and with water, dehydrated over Na$_2$SO$_4$ and evaporated to dryness. By crystallization from methanol there are obtained 0.32 part of 2-cyano-3-n-pentylamino-estra-1,3,5(10)-triene-17β-ol-17-acetate, M.P. 99–101° C.

EXAMPLE 12

2-cyano-3-amino-19-nor-cholesta-1,3,5(10),6-tetraene

A solution of 0.8 part of 2α-cyano-19-nor-cholesta-4,6-diene-3-one in 20 parts ethanol is refluxed with 0.8 part of ammonium formate. After 24 hours the solution is concentrated to a small volume and is diluted with water. The separated product is filtered and after chromatography on alumina, there are obtained 0.44 part 2-cyano-3-amino-19-nor-cholesta-2,4,6-triene; $\lambda_{max}$ 233, 282, 308, 362 m$\mu$ ($\epsilon$ 12,400, 14,700, 3,100, 5,800). 0.4 part of this compound were dehydrogenated with 2,3-dichloro-5,6-dicyano-benzoquinone, by operating as in Example 11, to obtain 0.17 part of 2-cyano-3-amino-19-nor-cholesta-1,3,5(10),6-tetraene.

EXAMPLE 13

2-cyano-3-pyrrolidyl-estra-1,3,5(10)-triene-17β-ol

A solution of 4 parts of 2α-cyano-19-nor-testosterone in dry benzene is treated with 1.5 parts of pyrrolidine. After refluxing for 4 hours, evaporating the solvent and crystallizing from acetone, there are obtained 2.8 parts of 2-cyano-3-pyrrolidyl-estra-2,4-diene-17β-ol; $\lambda_{max}$ 231, 248, 356 mμ. 1.8 parts of this compound are dehydrogenated with 1.275 parts 2,3-dicyano-5,6-dichlorobenzoquinone, by operating as in Example 11, to give, after chromatography, 0.85 part of 2-cyano-3-pyrrolidyl-estra-1,3,5(10)-triene-17β-ol; $\lambda_{max}$ 224, 246, 312 mμ.

EXAMPLE 14

2-cyano-3-acetylamino-estra-1,3,5(10),16-tetraene-17β-ol-17-acetate 12.5 parts of 2-cyano-3-acetylamino-estra-1,3,5(10)-triene-17β-ol-17-acetate are refluxed with 200 parts of a 2.5% methanol solution of KOH. After concentration to a small volume, extraction with methylene chloride, washing with water to neutrality and evaporation to dryness, there were obtained 9.5 parts of 2-cyano-3-amino-estra-1,3,5(10)-triene-17β-ol. This product was dissolved in 315 parts of toluene and 70 parts of cyclohexanone. 50 parts of toluene was distilled off and then to the mixture, there were added within 15 minutes, 9 parts of aluminum isopropylate dissolved in 130 parts of dry toluene. The whole is refluxed for 8 hours and then there are added 45 g. of Seignette salt in 63 ml. of water; the aqueous phase is separated, the toluene is washed with water, then toluene is fully distilled and cyclohexanone is steam-distilled. The crystallized product is filtered and crystallized from methanol to give 7.35 parts of 2-cyano-3-amino-estra-1,3,5(10)-triene-17-one ($\lambda_{max}$ 220, 246, 331 mμ). This compound, dissolved in pyridine (28 parts), was treated with 14 parts of acetic anhydride and kept 16 hours at 10° C. By diluting with water and filtering, there were obtained 7.45 parts of 2-cyano-3-acetylamino-estra-1,3,5(10)-triene-17-one ($\lambda_{max}$ 224, 243, 292 mμ).

5.2 parts of the latter derivative were dissolved in 83 parts of isopropenyl acetate and 0.9 part p-toluensulfonic acid monohydrate were added.

The mixture was slowly refluxed on the water bath, while distilling 37 parts of solvent within 14 hours.

After cooling, the mixture is diluted with ethyl ether, washed repeatedly with sodium bicarbonate and with water to neutrality. The organic phase, dehydrated on sodium sulfate, was brought to dryness and crystallized from hexane to give 2.97 parts of 2-cyano-3-acetylamino-estra-1,3,5(10),16-tetraene-17-ol-17-acetate.

EXAMPLE 15

2-cyano-3-acetylamino-16α-chloro-estra-1,3,5(10)-triene-17-one 2 parts of 2-cyano-3-acetylamino-estra-1,3,5(10),16-tetraene-17-ol-17-acetate are dissolved in 150 parts of carbon tetrachloride, the solution is cooled to about 3° C., 1.3 parts of dry potassium carbonate are first added and then 0.48 part of chlorine dissolved in 30 parts of carbon tetrachloride.

After 15 minutes, the mixture is diluted with water, the chlorine excess is decomposed with metabisulfite and the organic phase is washed with water to neutrality.

The solvent is evaporated to dryness and by crystallization from methanol there are obtained 0.89 part of 2-cyano-3-acetylamino-16α-chloro-estra-1,3,5(10)-triene-17-one.

EXAMPLE 16

2-cyano-3-acetylamino-17α-ethynyl-estra-1,3,5(10)-triene-17β-ol

A solution of 3 parts of 2-cyano-3-acetylamino-estra-1,3,5(10)-triene-17-one, prepared according to Example 14, in 20 parts of dimethylformamide is deaerated by a current of nitrogen, 1.4 parts of sodium amide are added and, while keeping the temperature between 0 and 10° C., acetylene is bubbled through it. After two hours of bubbling, the solution is diluted with water, brought to pH 4.5–5 with dilute acetic acid and extracted. By chromatography on silica gel, there are obtained 1.82 parts of 2-cyano-3-acetylamino - 17α - ethynyl-estra-1,3,5(10)-triene-17β-ol.

EXAMPLE 17

2-cyano-3-acetylamino-17α-vinyl-estra-1,3,5(10)-triene-17β-ol 0.5 part of 2-cyano - 3 - acetylamino-17α-ethynyl-1,3,5(10)-triene-17β-ol is hydrogenated in pyridine in the presence of 0.2 part of 2% Pd/CaCO$_3$ up to the absorption of the equivalent of one mole of H$_2$. The catalyst is filtered off, the filtrate is evaporated to dryness, and crystallization is effected from hexane-ethyl ether to obtain 0.41 part of 2-cyano-3-acetylamino-17α-vinyl-estra-1,3,5(10)-triene-17β-ol.

EXAMPLE 18

2-cyano-3-acetylamino-17α-ethyl-estra-1,3,5(10)-triene-17β-ol

A solution of 2 parts of 2-cyano-3-acetylamino-17α-ethynyl-estra-1,3,5(10)-triene-17β-ol in 40 parts ethanol is hydrogenated in the presence of 0.6 part 5% Pd/CaCO$_3$, up to the absorption of the equivalent of 2 moles of hydrogen. The catalyst is filtered off, the solution is evaporated to dryness, and the product crystallized from ethyl ether to obtain 1.83 parts of 2-cyano-3-acetylamino-17α-ethyl-estra-1,3,5(10)-triene-17β-ol.

What we claim is:

1. A compound of the formula

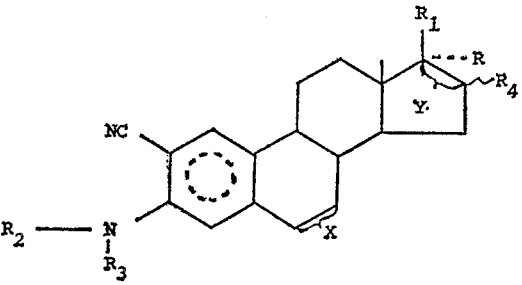

wherein R is individually a member selected from the group consisting of H, lower alkyl, —CH=CH—b and —C≡C—b, b being a member selected from the group consisting of H and lower alkyl; R$_1$ is individually a member selected from the group consisting of hydroxy, —C$_8$H$_{17}$ and acyloxy in which the acyl radical is derived from a saturated aliphatic carboxylic acid of from 2 to 10 carbon atoms phenylpropionic, phenyl propiolic, cinnamic, benzoic, salicylic; R and R$_1$ together constitute keto; R$_2$ is individually a member selected from the group consisting of H, lower alkyl, phenyl, lower alkoxycarbonyl and acyl derived from a saturated aliphatic carboxylic acid of from 2 to 10 carbon atoms; R$_3$ is individually a member selected from the group consisting of H, lower alkyl, and acyl derived from a saturated aliphatic carboxylic acid of from 2 to 10 carbon atoms; R$_2$ and R$_3$ together constitute a member selected from the group consisting of C$_6$H$_5$—CH=, C$_2$H$_5$OCH=, and

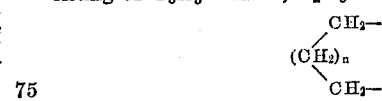

where $n$ is an integer from 1 to 3; $R_4$ is a member selected from the group consisting of H, Cl, Br, and I; X and Y are each a member selected from the group consisting of a single and a double bond and the interrupted circle within ring A indicates the 1,3,5(10)- or the 2,4, 10(1)-triene.

2. A compound of the formula

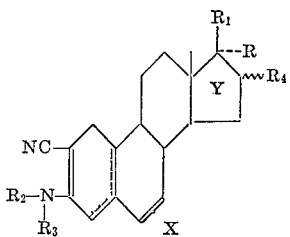

wherein R is individually a member selected from the group consisting of H, lower alkyl, —CH=CH—b and —C≡C—b, b being a member selected from the group consisting of H and lower alkyl; $R_1$ is individually a member selected from the group consisting of hydroxy, —$C_8H_{17}$ and acyloxy in which the acyl radical is derived from a saturated aliphatic carboxylic acid of from 2 to 10 carbon atoms; R and $R_1$ together constitute keto; $R_2$ is individually a member selected from the group consisting of H, lower alkyl, phenyl, lower alkoxycarbonyl and acyl derived from a saturated aliphatic carboxylic acid of from 2 to 10 carbon atoms; $R_3$ is individually a member selected from the group consisting of H, lower alkyl, and acyl derived from a saturated aliphatic carboxylic acid of from 2 to 10 carbon atoms; $R_2$ and $R_3$ together constitute a member selected from the group consisting of $C_6H_5$—CH=, $C_2H_5OCH$=, and

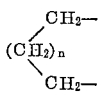

where $n$ is an integer from 1 to 3; $R_4$ is a member selected from the group consisting of H, Cl, Br, and I; X and Y are each a member selected from the group consisting of a single and a double bond and the interrupted lines in ring A indicate a double bond between only one of the pairs of carbon atoms 4,5 and 5(10).

3. A method of preparing a compound as claimed in claim 1, comprising dehydrogenating and aromatizing in an inert organic solvent, a compound as claimed in claim 2 singly or in admixture with its isomer at a temperature of from 10° to 280° C. in the presence of a hydrogen acceptor selected from the group consisting of ethyl and methyl maleate, fumarate and cinnamate, styrene and stilbene and a hydrogen transfer agent selected from the group consisting of Pd/C and Pt/C.

4. A method of preparing a compound as claimed in claim 1, comprising dehydrogenating and aromatizing in an inert organic solvent, a compound as claimed in claim 2 singly or in admixture with its isomer at a temperature of from 10° to 280° C. in the presence of a hydrogen acceptor selected from the group consisting of dichlorodicyanobenzoquinone and tetrachlorobenzoquinone.

No references cited.

HENRY A. FRENCH, *Primary Examiner.*

U.S. Cl. X.R.

260—239.55, 397.1, 397.2, 397.3, 397.4, 397.5, 999